United States Patent
Aoki et al.

(10) Patent No.: US 11,458,707 B2
(45) Date of Patent: Oct. 4, 2022

(54) LAMINATED GLASS

(71) Applicant: AGC Inc., Chiyoda-ku (JP)

(72) Inventors: Tokihiko Aoki, Tokyo (JP); Shunsuke Sadakane, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 238 days.

(21) Appl. No.: 17/008,716

(22) Filed: Sep. 1, 2020

(65) Prior Publication Data

US 2022/0063401 A1    Mar. 3, 2022

(51) Int. Cl.
B32B 17/10    (2006.01)

(52) U.S. Cl.
CPC .. B32B 17/10165 (2013.01); B32B 17/10036 (2013.01); B32B 2307/416 (2013.01); B32B 2307/732 (2013.01)

(58) Field of Classification Search
CPC ........ B32B 17/10165; B32B 17/10036; B32B 2307/416; B32B 2307/732
USPC .......................................................... 428/203
See application file for complete search history.

(56) References Cited

U.S. PATENT DOCUMENTS

| | | | |
|---|---|---|---|
| 6,327,089 B1 | 12/2001 | Hosaki et al. | |
| 6,455,141 B1 | 9/2002 | Woodard et al. | |
| 2004/0135742 A1 | 7/2004 | Weber et al. | |
| 2012/0021230 A1* | 1/2012 | Fukatani | C08K 5/11 252/589 |
| 2016/0075111 A1 | 3/2016 | Dixon | |
| 2016/0091756 A1 | 3/2016 | Watano et al. | |
| 2017/0106634 A1 | 4/2017 | Lu | |
| 2017/0242247 A1 | 8/2017 | Tso et al. | |
| 2017/0334172 A1 | 11/2017 | Keller | |
| 2018/0272660 A1* | 9/2018 | Aoki | B32B 17/10761 |
| 2019/0299752 A1 | 10/2019 | Sadakane et al. | |
| 2019/0330501 A1* | 10/2019 | Kurihara | C08C 19/25 |
| 2022/0063401 A1* | 3/2022 | Aoki | B32B 7/022 |

FOREIGN PATENT DOCUMENTS

| | | |
|---|---|---|
| EP | 3 187 917 A2 | 7/2017 |
| JP | 4-275956 A | 10/1992 |
| JP | 10-96874 A | 4/1998 |
| JP | 2000-249966 A | 9/2000 |

(Continued)

OTHER PUBLICATIONS

Office Action dated Apr. 27, 2022, in co-pending U.S. Appl. No. 17/143,218.

*Primary Examiner* — Betelhem Shewareged (74) *Attorney, Agent, or Firm* — Oblon, McClelland, Maier & Neustadt, L.L.P.

(57) ABSTRACT

A laminated glass includes a vehicle-outer side glass plate, a vehicle-inner side glass plate, an interlayer film disposed between the vehicle-outer side glass plate and the vehicle-inner side glass plate, and a first film disposed between the interlayer film and one of the vehicle-outer side glass plate and the vehicle-inner side glass plate, the first film being bonded by a first adhesive layer to the one of the vehicle-outer side glass plate and the vehicle-inner side glass plate, wherein the first film is disposed in at least a part of a display area configured to display information by reflecting an image projected from an inside of a vehicle, and wherein a thickness of the first adhesive layer is 6 μm or more, and is less than 25 μm.

16 Claims, 5 Drawing Sheets

(56) References Cited

FOREIGN PATENT DOCUMENTS

| | | |
|---|---|---|
| JP | 2003-192402 A | 7/2003 |
| JP | 2006-512622 A | 4/2006 |
| JP | 2016-71078 A | 5/2016 |
| JP | 6065221 B2 | 1/2017 |
| JP | 2017-538141 A | 12/2017 |
| JP | 2019-172512 A | 10/2019 |
| WO | WO 97/03763 A1 | 2/1997 |
| WO | WO 2005/017600 A1 | 2/2005 |
| WO | WO 2013/190959 A | 12/2013 |
| WO | WO 2016/194890 A1 | 12/2016 |

* cited by examiner

| | THICKNESS OF ADHESIVE LAYER 250 | THICKNESS OF ADHESIVE LAYER 260 | APPEARANCE AND REFLECTION DISTORTION OF GLASS | DISTORTION OF HUD IMAGE PROJECTED ON CONCAVE MIRROR | PRESENCE OR ABSENCE OF EDGE DETERIORATION |
|---|---|---|---|---|---|
| EXAMPLE 1 | 6 μm | — | GOOD | GOOD | GOOD |
| EXAMPLE 2 | 10 μm | — | GOOD | GOOD | GOOD |
| EXAMPLE 3 | 15 μm | — | GOOD | GOOD | GOOD |
| EXAMPLE 4 | 20 μm | — | GOOD | GOOD | GOOD |
| EXAMPLE 5 | 24 μm | — | GOOD | GOOD | GOOD |
| COMPARATIVE EXAMPLE 1 | 5 μm | — | GOOD | POOR | POOR |
| COMPARATIVE EXAMPLE 2 | 25 μm | — | GOOD | POOR | GOOD |
| EXAMPLE 6 | 6 μm | 1 μm | GOOD | GOOD | GOOD |
| EXAMPLE 7 | 15 μm | 15 μm | GOOD | GOOD | GOOD |
| EXAMPLE 8 | 10 μm | 24 μm | GOOD | GOOD | GOOD |
| COMPARATIVE EXAMPLE 3 | 30 μm | 10 μm | GOOD | POOR | GOOD |
| COMPARATIVE EXAMPLE 4 | 10 μm | 25 μm | GOOD | POOR | GOOD |

LAMINATED GLASS

BACKGROUND OF THE INVENTION

1. Field of the Invention

The present disclosure relates to laminated glass.

2. Description of the Related Art

In recent years, a head-up display (hereinafter also referred to as a HUD) that projects an image onto a windshield of a vehicle to display predetermined information in the field of view of the driver has been introduced. One of the problems associated with the HUD is the improvement of the visibility of HUD images. Therefore, there is known a technique for sealing a film into a laminated glass to display information by causing the area where the film is placed to reflect the image projected from the inside of the vehicle.

Various films may be considered as films to be sealed in the laminated glass, but, for example, a film reflecting P-polarized light may be used. When such a film reflecting P-polarized light is sealed in the laminated glass, a light source of the HUD emitting P-polarized light projects an image in the P-polarized state. Therefore, the visibility of the HUD image seen through polarized sunglasses can be improved (see Japanese Translation of PCT International Application Publication No. 2006-512622).

SUMMARY OF THE INVENTION

Technical Problem

However, when a film is placed in the laminated glass, the smoothness of the film directly affects the distortion of the HUD image.

The smoothness of the film depends on the specifications of the adhesive layer for fixing the film, but optimization of the specifications of the adhesive layer for curved laminated glass has not been sufficiently studied, and the distortion of the HUD image is not sufficiently reduced.

The present disclosure has been made in view of the above problems, and it is an object of the present disclosure to reduce the distortion of an HUD image on laminated glass having a film in a display area for displaying information by reflecting an image projected from the inside of a vehicle.

Means for Solving the Problems

According to the present disclosure, a laminated glass includes a vehicle-outer side glass plate, a vehicle-inner side glass plate, an interlayer film disposed between the vehicle-outer side glass plate and the vehicle-inner side glass plate, and a first film disposed between the interlayer film and one of the vehicle-outer side glass plate and the vehicle-inner side glass plate, the first film being bonded by a first adhesive layer to the one of the vehicle-outer side glass plate and the vehicle-inner side glass plate, wherein the first film is disposed in at least a part of a display area configured to display information by reflecting an image projected from an inside of a vehicle, and wherein a thickness of the first adhesive layer is 6 μm or more, and is less than 25 μm.

Advantageous Effects of Invention

According to an embodiment of the disclosure, the distortion of an HUD image can be reduced on laminated glass having a film in a display area for displaying information by reflecting an image projected from the inside of a vehicle.

DETAILED DESCRIPTION OF THE PREFERRED EMBODIMENTS

Hereinafter, embodiments for carrying out the invention will be described with reference to the drawings. In the drawings, the same reference numerals are given to similar constituent elements, and duplicate description thereabout may be omitted. Although a windshield for a vehicle will be described herein as an example, the present invention is not limited thereto, and a laminated glass according to the present embodiment can be applied to glass other than windshields for vehicles. In the drawings, the sizes and shapes are partially exaggerated for the sake of understanding of the present invention.

First Embodiment

FIGS. 1A to 1C and FIGS. 2A to 2C are drawing schematically illustrating windshields for vehicles as seen from the inside to the outside of the vehicles.

Figure 1A:
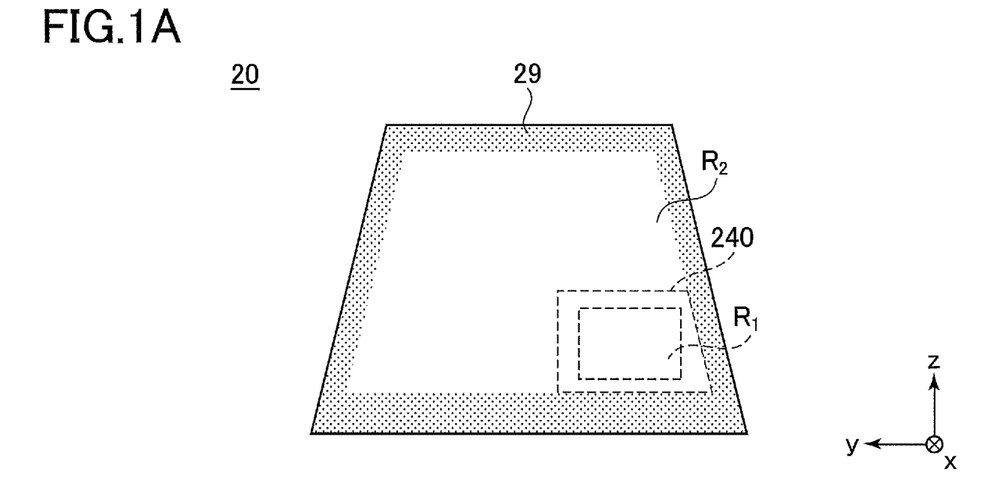
FIGS. 1A to 1C are drawings schematically illustrating windshields for vehicles as seen in a direction from the inside to the outside of the vehicles.

As illustrated in FIG. 1A, the windshield 20 includes an HUD display area $R_1$ that is used by the HUD and a non-HUD display area $R_2$ (see-through area) that is not used by the HUD. The HUD display area $R_1$ is a display area for displaying information by reflecting an image projected from the inside of the vehicle. The HUD display area $R_1$ is assumed to be an area of the windshield 20 irradiated with light reflected by a mirror that is a component of the HUD disposed in the vehicle as seen from a point "V1" defined in JIS R3212 when the mirror that is a component of the HUD is rotated. Also, in this specification, the see-through area means an area of a test area C as defined in JIS R3211.

A black ceramic layer 29 is preferably provided in a peripheral portion of the windshield 20. The black ceramic layer 29 can be formed by applying a black ceramic printing ink on a glass surface and baking the applied black ceramic printing ink. The presence of the black opaque black ceramic layer 29 in the peripheral portion of the windshield 20 protects a resin such as urethane, holding the peripheral portion of the windshield 20 on the vehicle body, from ultraviolet rays. The black ceramic layer 29 is preferably provided on the vehicle-inner side surface of the glass plate 210 or the vehicle-inner side surface of the glass plate 220, or the black ceramic layers 29 are provided on both of the vehicle-inner side surface of the glass plate 210 and the vehicle-inner side surface of the glass plate 220.

For example, the HUD display area $R_1$ is located at a lower part of the windshield 20, and the non-HUD display area $R_2$ is located around the HUD display area $R_1$ of the windshield 20. In the example of FIG. 1A, a film 240 is provided in the HUD display area $R_1$ and an area around the HUD display area $R_1$. The film 240 does not have an area overlapping the black ceramic layer 29.

Figure 1B:
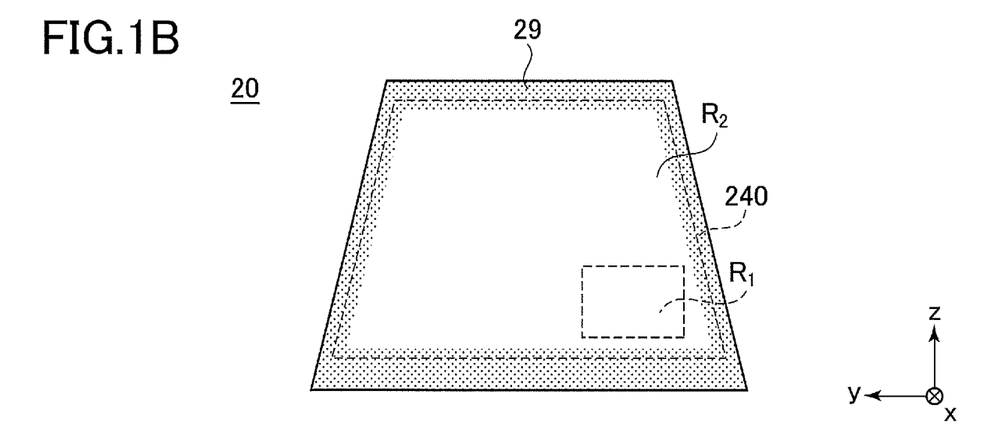
Figure 1C:
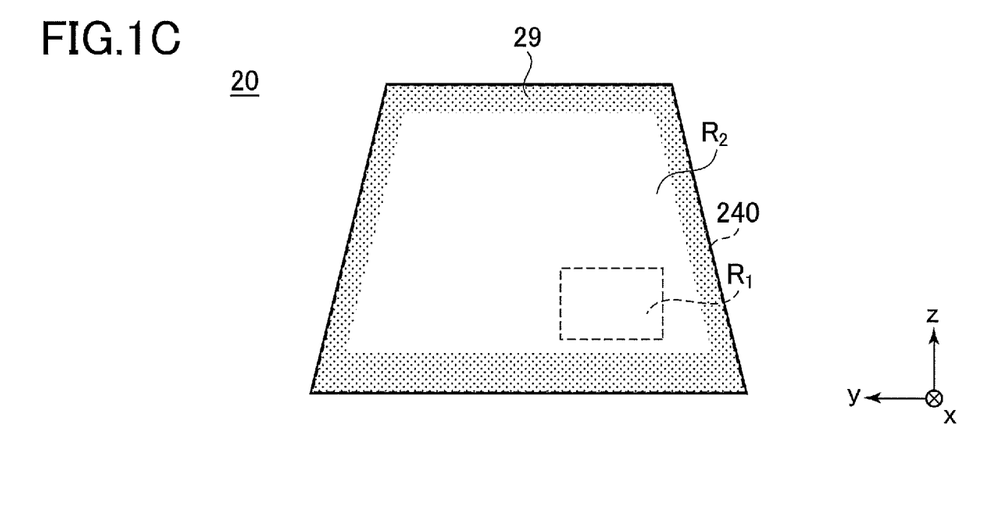

For example, as illustrated in FIG. 1B, the film 240 may be arranged to include the entire HUD display area $R_1$ and the entire non-HUD display area $R_2$ in such a manner that the outer peripheral area of the film 240 overlaps the inner peripheral area of the black ceramic layer 29. Alternatively, for example, as illustrated in FIG. 1C, the film 240 may be arranged to include the entire HUD display area $R_1$ and the entire non-HUD display area $R_2$ in such a manner that the outer peripheral area of the film 240 overlaps substantially the entire black ceramic layer 29.

Figure 2A:
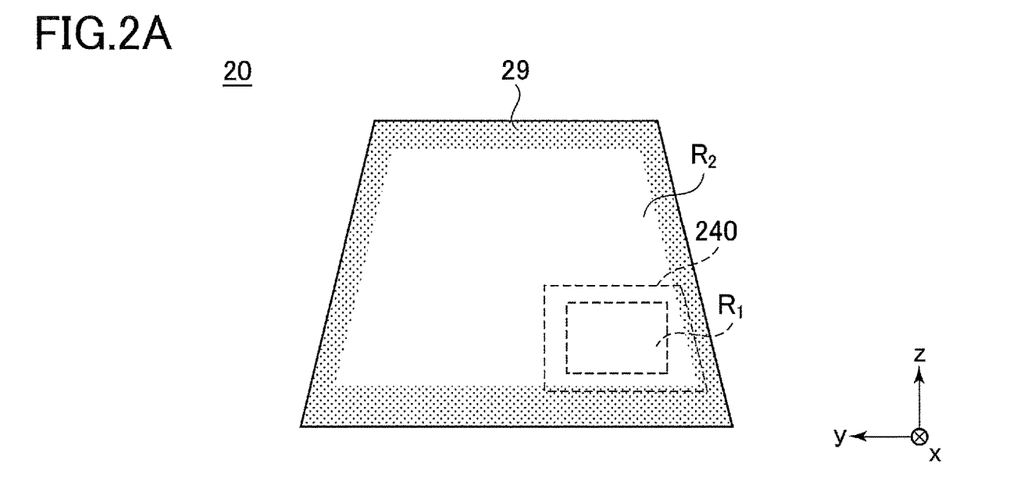
FIGS. 2A to 2C are drawings schematically illustrating windshields for vehicles as seen in a direction from the inside to the outside of the vehicles.
Figure 2B:
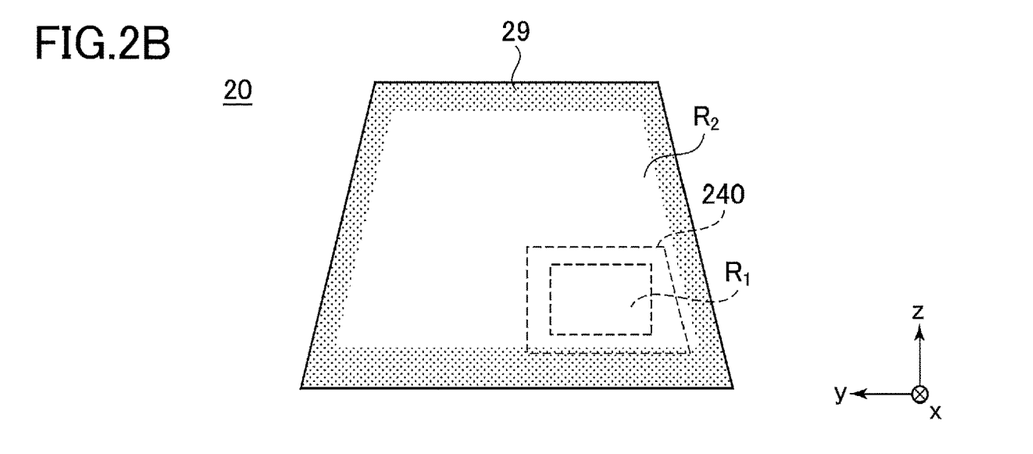
Figure 2C:
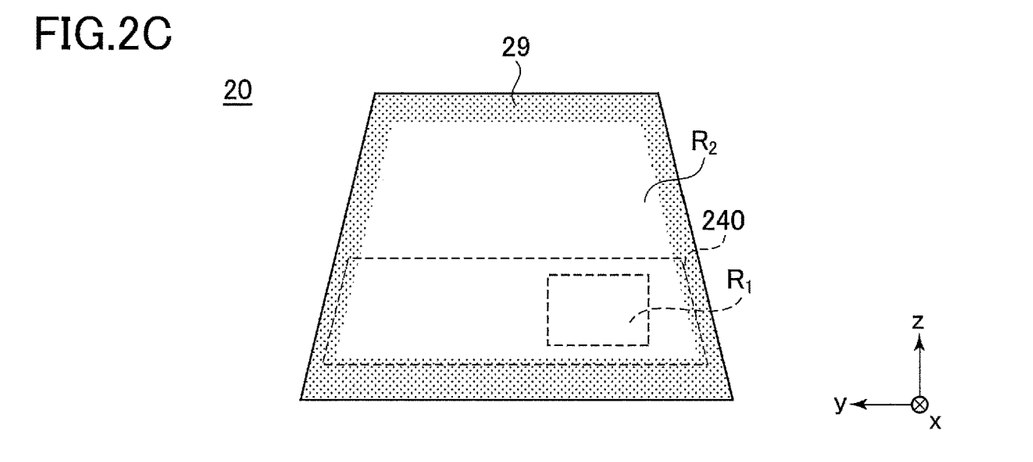

For example, as illustrated in FIG. 2A, the film 240 may be arranged to include the HUD display area $R_1$ and an area around the HUD display area $R_1$ in such a manner that a lower side portion and one of right and left side portions of the film 240 overlap the inner peripheral area of the black ceramic layer 29. Alternatively, for example, as illustrated in FIG. 2B, the film 240 may be arranged to include the HUD display area $R_1$ and an area around the HUD display area $R_1$ in such a manner that a lower side portion of the film 240 overlaps the inner peripheral area of the black ceramic layer 29. Still alternatively, for example, as illustrated in FIG. 2C, the film 240 may be arranged to include the HUD display area $R_1$ and an area around the HUD display area $R_1$ in such a manner that a lower side portion and both of right and left side portions of the film 240 overlap the inner peripheral area of the black ceramic layer 29.

Instead of providing the HUD display area at a single location, for example, HUD display areas may be provided in a distributed manner at multiple locations in the Z direction, or HUD display areas may be provided in a distributed manner at multiple locations in the Y direction. In a case where HUD display areas are provided in a distributed manner at multiple locations, the film 240 may be provided in at least a portion of the total HUD display area, and preferably, the films 240 are provided on the entirety of the total HUD display area.

Figure 3:
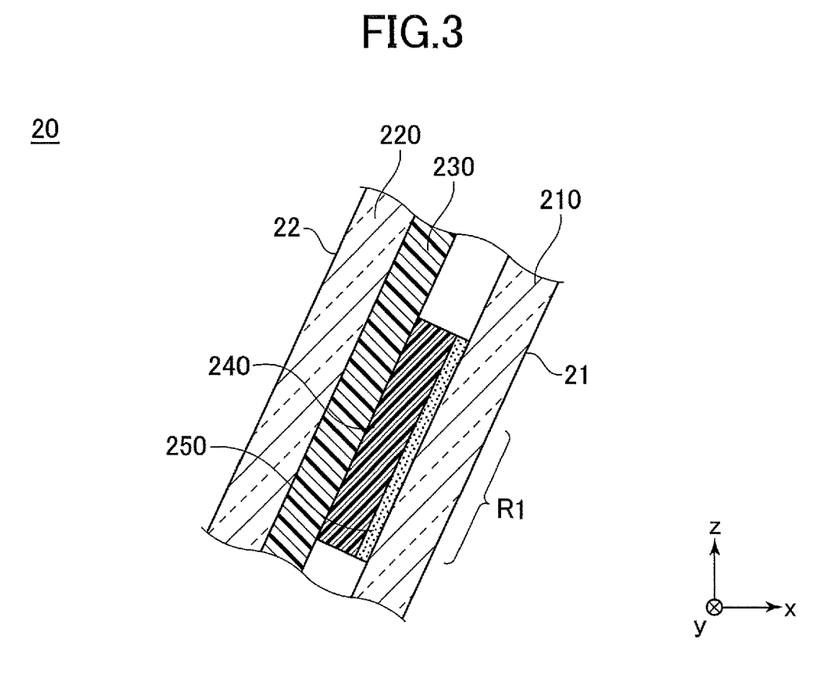
FIG. 3 is a partial cross-sectional view of a windshield 20 illustrated in FIG. 1A taken along the plane XZ as seen from the Y direction.

FIG. 3 is a partial cross-sectional view of a windshield 20 as illustrated in FIG. 1A taken along the XZ direction as seen from the Y direction. As illustrated in FIG. 3, the windshield 20 is laminated glass including an interlayer film 230, a film 240, and an adhesive layer 250, which are arranged between a glass plate 210, i.e., a vehicle-inner side glass plate, and a glass plate 220, i.e., a vehicle-outer side glass plate. In each of the cross-sectional view, there are gaps on either edge of the adhesive layer 250, and these cross-sectional views schematically illustrate the laminated structure of the present invention in order to facilitate understanding. In actual laminated glass, the gaps are filled with the interlayer film 230.

Hereinafter, the partial cross-sectional view of the windshield 20 as illustrated in FIG. 1A is explained. However, FIG. 1B, FIG. 1C, and FIG. 2A to FIG. 2C are different only in the size of the film 240 and the state of overlapping with the black ceramic layer 29, and basically have the same cross sectional shapes as the windshield 20.

In the HUD display area $R_1$ of the windshield 20, the film 240 and the adhesive layer 250 are arranged between the glass plate 210 and the interlayer film 230. A side of the film 240 at the vehicle-inner side is bonded by the adhesive layer 250 to a surface of the glass plate 210 at the vehicle-outer side. The surface of the film 240 at the vehicle-outer side is bonded by the interlayer film 230 to a surface of the glass plate 220 at the vehicle-inner side.

The film 240 is a visible light control film that reflects the image projected from the inside of the vehicle, and is not particularly limited as long as the film 240 has a predetermined function such as improving visibility under predetermined conditions. Examples of films 240 include a P-polarized light reflection film, a hologram film, a scattering type transparent screen, a high reflection film for HUD, and the like. For example, the thickness of the film 240 can be about 25 μm or more and 200 μm or less. The film 240 is transparent to visible light.

In a case where the film 240 is the P-polarized light reflection film, the reflectivity of P-polarized light with the incidence angle being the Brewster's angle is preferably 5% or more, when the film 240 is sealed in the windshield 20. With the reflectivity of P-polarized light being 5% or more, an HUD image can be seen.

The material of the adhesive layer 250 is not particularly limited as long as the material has the function of fixing the film 240. Examples of materials of the adhesive layer 250 include acrylic-based, acrylate-based, urethane-based, urethane acrylate-based, epoxy-based, epoxy acrylate-based, polyolefin-based, modified olefin-based, polypropylene-based, ethylene vinyl alcohol-based, vinyl chloride-based, chloroprene rubber-based, cyanoacrylate-based, polyamide-based, polyimide-based, polystyrene-based, and polyvinyl butyral-based materials. The material of the adhesive layer 250 is transparent to visible light. In addition, preferably, the material of the adhesive layer 250 does not have adhesiveness at the room temperature before the process of manufacturing the laminated glass.

The thickness of the adhesive layer 250 is 6 μm or more, and is less than 25 μm. When the thickness of the adhesive layer 250 is 6 μm or more, the adhesive layer 250 alleviates the difference in the thermal shrinkage between the glass plate 210 and the film 240 during pressure bonding in the production of laminated glass. Therefore, the smoothness of the surfaces of the film 240 at the vehicle-inner side and the vehicle-outer side is maintained, so that the distortion of the HUD image can be reduced. Further, when the thickness of the adhesive layer 250 is 6 μm or more, the edge deterioration of the adhesive layer 250 under repeated use in a high temperature and high humidity environment can be reduced.

Alternatively, when the thickness of the adhesive layer 250 is less than 25 μm, the surfaces of the film 240 at the vehicle-inner side and the vehicle-outer side become in conformity with the flat surface of the glass plate 210 at the vehicle-outer side. Therefore, the smoothness of the surfaces of the film 240 at the vehicle-inner side and the vehicle-outer side is maintained, and the distortion of the HUD image can be reduced. In particular, in a configuration in which an image enlarged by a concave mirror and the like is reflected upon being further enlarged by curved laminated glass, slight undulation of the surfaces of the film 240 at the vehicle-inner side and the vehicle-outer side causes a large distortion in the HUD image, and therefore, it is extremely important to improve the smoothness of the surfaces of the film 240 at the vehicle-inner side and the vehicle-outer side. When the thickness of the adhesive layer 250 is less than 25 μm, distortion of the HUD image can be alleviated even in a configuration in which an image enlarged by a concave mirror and the like is reflected upon being further enlarged by curved laminated glass.

More preferably, the thickness of the adhesive layer 250 is 6 μm or more and 20 μm or less, and still more preferably, the thickness of the adhesive layer 250 is 6 μm or more and 15 μm or less. When the thickness is in the above range, the surfaces of the film 240 at the vehicle-inner side and the vehicle-outer side are more likely to be able to become in conformity with the flat surface of the glass plate 210 at the vehicle-outer side, the smoothness of the surfaces of the film 240 at the vehicle-inner side and the vehicle-outer side is further improved, and the distortion of the HUD image can be further reduced.

When the thickness of the adhesive layer 250 is denoted as $t_1$ [mm] and the Young's modulus of the adhesive layer 250 is denoted as $E_1$ [N/mm²], the relationship between $t_1$ and $E_1$ preferably satisfies $E_1 t_1^3 \geq 5 \times 10^{-12}$. In this case, the Young's modulus $E_1$ in the present application is obtained as in Chapter 8 of JIS Z0237, "Testing methods of pressure-sensitive adhesive tapes and sheets", by dividing a "maximum load before a test piece is cut" by an "elongation" at the maximum load and further dividing the quotient by an "initial cross section" of the test piece. Within the range satisfying this expression, the rigidity of the adhesive layer 250 can be secured when the Young's modulus $E_1$ is large even when the thickness $t_1$ of the adhesive layer 250 is small, and the rigidity of the adhesive layer 250 required to reduce the distortion of the HUD image can be secured even when the Young's modulus $E_1$ is small as long as the thickness $t_1$ of the adhesive layer 250 is large.

It should be noted that the value of $5 \times 10^{-12}$ was derived though experiments based on the rigidity of the adhesive layer 250 at which no distortion occurs in an HUD image. More preferably, the relationship between $t_1$ and $E_1$ satisfies $E_1 t_1^3 \geq 5 \times 10^{-11}$, still more preferably satisfies $E_1 t_1^3 \geq 5 \times 10^{-10}$, and particularly more preferably satisfies $E_1 t_1^3 \geq 5 \times 10^{-9}$. Also, $E_1$ is preferably 5 kPa or more, more preferably 10 kPa or more, and still more preferably 20 kPa or more.

Alternatively, when the FOV (Field Of View) of the HUD is 4 deg×1 deg or more, a larger HUD image than a conventional HUD image is projected onto the windshield 20, which causes the film 240 to be more likely to be undulated. Therefore, it becomes more important to reduce the distortion of the HUD image by controlling the thickness of the adhesive layer 250. As the FOV of the HUD increases to 5 deg×1.5 deg or more, 6 deg×2 deg or more, and 7 deg×3 deg or more, a still larger HUD image than the conventional HUD image is projected onto the windshield 20, and the distortion of the HUD image caused by the undulation of the film 240 becomes conspicuous. Therefore, it becomes still more important to reduce the distortion of the HUD image by controlling the thickness of the adhesive layer 250.

Also, in the adhesive layer 250, a difference in the principal refractive index in an in-plane direction (a direction perpendicular to the thickness direction) at 550 nm is preferably within 0.1. When the adhesive layer 250 located at the vehicle-inner side with respect to the film 240 satisfies the above condition, the polarization state of the P-polarized light reaching the film 240 is less affected.

In the windshield 20, an inner surface 21 of the windshield 20, i.e., one of the surfaces of the glass plate 210 at the inner side of the vehicle, and an outer surface 22 of the windshield 20, i.e., one of the surfaces of the glass plate 220 at the outer side of the vehicle, may be either a flat surface or a curved surface. It should be noted that the one of the surfaces of the glass plate 210 (i.e., the inner surface 21) and the other of the surfaces of the glass plate 210 which is the opposite surface are smooth. The one of the surfaces of the glass plate 220 (i.e., the outer surface 22) and the other of the surfaces of the glass plate 220 which is the opposite surface are smooth.

In the HUD display area, the radius of curvature in the vertical direction of the windshield 20 is preferably 4000 mm or more and 20000 mm or less, and more preferably 6000 mm or more and 20000 mm or less. Also, in the HUD display area, the radius of curvature in the horizontal direction of the windshield 20 is preferably 1000 mm or more and 10000 mm or less. When the curvatures in the vertical direction and the horizontal direction are within the above ranges, the distortion of the HUD image projected on the film 240 can be alleviated. When the radius is small, the film is more likely to be wrinkled.

For example, the glass plates 210 and 220 may be made of soda lime glass, aluminosilicate, organic glass, and the like. For example, the glass plates 210 and 220 may be manufactured by a float process.

At the thinnest part, the plate thickness of the glass plate 220 located at the outer side of the windshield 20 is preferably 1.8 mm or more and 3 mm or less. When the plate thickness of the glass plate 220 is 1.8 mm or more, the strength such as a stone chipping resistance and the like is sufficient, and when it is 3 mm or less, the weight of the laminated glass does not become excessively heavy, which is preferable in terms of the fuel consumption of the vehicle. At the thinnest part, the plate thickness of the glass plate 220 is more preferably 1.8 mm or more and 2.8 mm or less, and is still more preferably 1.8 mm or more and 2.6 mm or less.

The plate thickness of the glass plate 210 located at the inner side of the windshield 20 is preferably 0.3 mm or more and 2.3 mm or less. When the plate thickness of the glass plate 210 is 0.3 mm or more, the ease of handling is high, and when the plate thickness of the glass plate 210 is 2.3 mm or less, the weight of the windshield 20 does not become excessively large.

When the plate thickness of the glass plate 210 is set to 0.3 mm or more and 2.3 mm or less, the glass quality (e.g., residual stress) can be maintained. When the plate thickness of the glass plate 210 is 0.3 mm or more and 2.3 mm or less, it is especially effective in maintaining the glass quality (for example, residual stress) in glass with a tight curve. The plate thickness of the glass plate 210 is more preferably 0.5 mm or more and 2.1 mm or less, and is still more preferably 0.7 mm or more and 1.9 mm or less.

However, the plate thicknesses of the glass plates 210 and 220 may not be always constant, and may change as necessary depending on the location. For example, one of or both of the glass plates 210 and 220 may have an area in a wedge shape as seen in the cross section, in which a thickness at an upper end of the windshield 20 is larger than a thickness at a lower end of the windshield 20 with respect to the orientation of the windshield 20 attached to the vehicle.

In a case where the windshield 20 is of a curved shape, the glass plates 210 and 220 are formed in a float process and the like, and are thereafter bent in a bending process before being bonded with the interlayer film 230. The bending process is performed while the glass is softened with heat. The heating temperature of glass during the bending process is approximately 550 degrees Celsius to 700 degrees Celsius.

Thermoplastic resins are often used as the interlayer film 230 for bonding the glass plate 210 and the glass plate 220. Examples of thermoplastic resins include thermoplastic resins conventionally used for this kind of purpose such as plasticized polyvinyl acetal-based resins, plasticized polyvinyl chloride-based resins, saturated polyester-based resins, plasticized saturated polyester-based resins, polyurethane-based resins, plasticized polyurethane-based resins, ethylene-vinyl acetate copolymer-based resins, and ethylene-ethyl acrylate copolymer-based resins. A resin composition containing a modified block copolymer hydride described in Japanese Patent No. 6065221 can also be preferably used.

Among them, the plasticized polyvinyl acetal-based resins are preferably used because the plasticized polyvinyl acetal-based resins are excellent in the balance of various performances such as transparency, weather resistance, strength, adhesive strength, penetration resistance, impact energy absorption, moisture resistance, heat insulation, and sound insulation. These thermoplastic resins may be used alone or a combination of two or more may be used. "Plasticized" as in the plasticized polyvinyl acetal-based resins means being plasticized with an addition of a plasticizer. The above is also applicable to other plasticized resins.

Examples of polyvinyl acetal-based resins include polyvinyl formal resins obtained by reacting polyvinyl alcohol (which may be hereinafter referred to as "PVA" as necessary) with formaldehyde, a polyvinyl acetal resin in the narrow sense that is obtained by reacting PVA with acetaldehyde, and polyvinyl butyral resins (which may be hereinafter referred to as "PVB" as necessary) obtained by reacting PVA with n-butyraldehyde. In particular, the PVB is preferable because the PVB is excellent in the balance of various performances such as transparency, weather resistance, strength, adhesive strength, penetration resistance, impact energy absorption, moisture resistance, heat insulation, and sound insulation. These polyvinyl acetal-based resins may be used alone or a combination of two or more may be used. However, the material that is a component of the interlayer film 230 is not limited to the thermoplastic resin.

At the thinnest part, the film thickness of the interlayer film 230 is preferably 0.5 mm or more. When the minimum value of the film thickness of the interlayer film 230 is 0.5 mm or more, the penetration resistance required for the windshield becomes sufficient. At the thickest part, the film thickness of the interlayer film 230 is preferably 3 mm or less. When the maximum value of the film thickness of the interlayer film 230 is 3 mm or less, the weight of the laminated glass does not become excessively large. The maximum value of the film thickness of the interlayer film 230 is more preferably 2.8 mm or less, and is still more preferably 2.6 mm or less.

However, the film thickness of the interlayer film 230 may not be always constant, and may change as necessary depending on the location. For example, the interlayer film 230 may have an area in a wedge shape as seen in the cross section, in which a thickness at an upper end of the windshield 20 is larger than a thickness at a lower end of the windshield 20 with respect to the orientation of the windshield 20 attached to the vehicle.

It should be noted that the interlayer film 230 may include three or more layers. For example, the interlayer film may be constituted by three layers, and the hardness of the middle layer may be set to a hardness less than the hardness of the layers on both sides of the middle layer by adjusting the plasticizer and the like, so that the sound insulation property of the laminated glass can be improved. In this case, the hardness of the layers on the both sides may be the same or different.

For example, in order to manufacture the interlayer film 230, the resin material explained above, which is made into the respective interlayer films, is appropriately selected, and extrusion molding is performed using an extruder in a heated and melted state. The extrusion conditions such as the extrusion speed of the extruder are uniformly set. Thereafter, for example, the extruded resin film is stretched as needed in order to make a curvature on the upper side and the lower side according to the design of the windshield 20. As a result, the interlayer film 230 is completed.

In order to manufacture laminated glass, the interlayer film 230, the film 240, and the adhesive layer 250 (the adhesive layer 250 is provided on one of the sides of the film 240) are sandwiched between the glass plate 210 and the glass plate 220 to make a laminated body in advance, and for example, this laminated body is placed in a rubber bag and bonded at a temperature of 70 to 110 degrees Celsius in a vacuum at −65 to −100 kPa.

Further, for example, laminated glass with a higher durability can be obtained by performing a pressure bonding process for heating and pressurizing under a condition of 100 to 150 degrees Celsius and a pressure of 0.6 to 1.3 MPa. However, in some cases, this heating and pressurizing process may not be used in order to simplify the process and in view of the characteristics of the material to be sealed in the laminated glass.

It should be noted that not only the interlayer film 230 and the film 240 but also a film or a device having the functions of infrared reflection, light emission, power generation, dimming, visible light reflection, scattering, decoration, absorption, and the like may be provided between the glass plate 210 and the glass plate 220, as long as the effects of the present invention are not impaired.

In this manner, in the windshield 20 in which the film 240 is arranged in the HUD display area displaying information by reflecting the image projected from the inside of the vehicle, the thickness of the adhesive layer 250 bonding the glass plate 210 and the film 240 is set to 6 μm or more, and to less than 25 μm, so that the distortion of the HUD image can be reduced.

First Modified Embodiment of First Embodiment

The first modified embodiment of the first embodiment shows an example in which an adhesive layer is also provided between the film and the interlayer film. In the first modified embodiment of the first embodiment, explanation about the same components as those of the embodiment explained above may be omitted.

Figure 4:
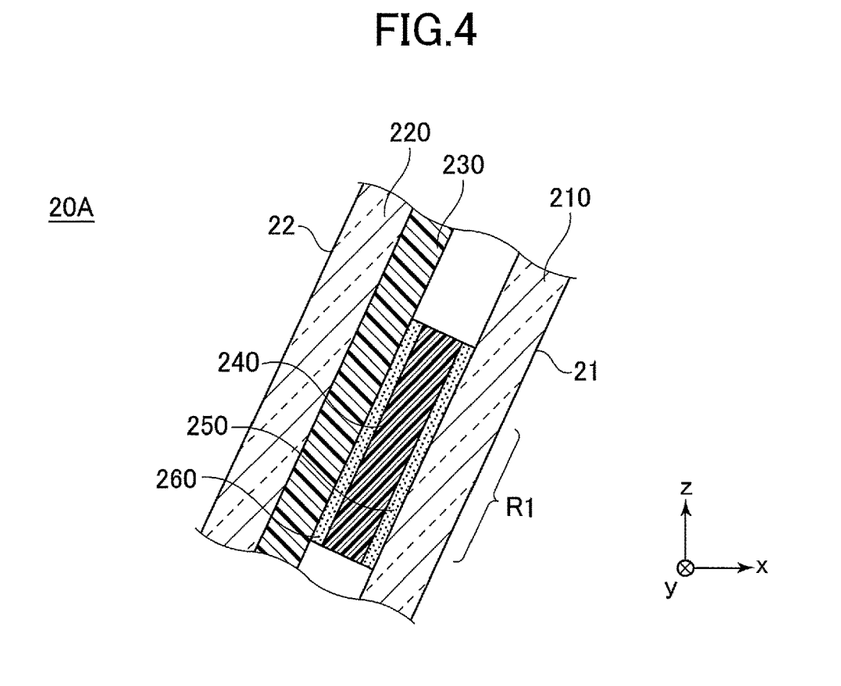
FIG. 4 is a partial cross-sectional view of a windshield 20A in a configuration similar to FIG. 1A taken along the plane XZ as seen from the Y direction.

FIG. 4 is a partial cross-sectional view of a windshield 20A, having a configuration similar to FIG. 1A, taken along the XZ direction as seen from the Y direction.

The windshield 20A illustrated in FIG. 4 is different from the windshield 20 (see FIG. 3) in that an adhesive layer 260 is provided between a film 240 and an interlayer film 230. As illustrated in FIG. 4, the windshield 20A is laminated glass in which the interlayer film 230, the film 240, an adhesive layer 250, and the adhesive layer 260 are provided between a glass plate 210, i.e., a vehicle-inner side glass plate, and a glass plate 220, i.e., a vehicle-outer side glass plate.

In the HUD display area $R_1$ of the windshield 20A, the film 240 and the adhesive layers 250 and 260 are arranged between the glass plate 210 and the interlayer film 230. A surface of the film 240 at the vehicle-inner side is bonded by the adhesive layer 250 to a surface of the glass plate 210 at the vehicle-outer side. A surface of the film 240 at the vehicle-outer side is bonded by the adhesive layer 260 to a surface of the interlayer film 230 at the vehicle-inner side.

The film 240 and the interlayer film 230 may be difficult to be bonded. In such case, it is preferable to provide the adhesive layer 260 to bond the surface of the film 240 at the vehicle-outer side to the surface of the interlayer film 230 at the vehicle-inner side.

The material and thickness of the adhesive layer 250 are as described in the first embodiment. The material of the adhesive layer 260 can be appropriately selected from among the materials exemplified as the material of the adhesive layer 250 in the first embodiment.

The thickness of the adhesive layer 260 is preferably 1 μm or more, and is less than 25 μm. When the thickness of the adhesive layer 260 is set to 1 μm or more, an effect of preventing degradation of the adhesive layer under a high temperature and high humidity can be obtained.

Also, when the thickness of the adhesive layer 260 is set to less than 25 μm, an improvement of degassing performance in the manufacturing steps of the laminated glass and an effect of reduction of the optical distortion can be obtained. When the thickness of the adhesive layer 260 is set to less than 25 μm, distortion of the HUD image can be alleviated even in a configuration in which an image enlarged by a concave mirror and the like is reflected upon being further enlarged by curved laminated glass.

The thickness of the adhesive layer 260 is more preferably 1 μm or more and 20 μm or less, and is still more preferably 1 μm or more and 15 μm or less. When the thickness is in the above range, an improvement of degassing performance in the manufacturing steps of the laminated glass and an effect of reduction of the optical distortion can be obtained, and the distortion of the HUD image can be further reduced.

When the thickness of the adhesive layer 260 is denoted as $t_2$ [mm] and the Young's modulus is denoted as $E_2$ [N/mm$^2$], the relationship between $t_2$ and $E_2$ preferably satisfies $E_2 t_2^3 \geq 5 \times 10^{-12}$. In this case, the Young's modulus $E_2$ in the present application is obtained as in Chapter 8 of JIS Z0237, "Testing methods of pressure-sensitive adhesive tapes and sheets", by dividing a "maximum load before a test piece is cut" by an "elongation" at the maximum load and further dividing the quotient by an "initial cross section" of the test piece. Within the range satisfying this expression, the rigidity of the adhesive layer 260 can be secured when the Young's modulus $E_2$ is large even when the thickness $t_2$ of the adhesive layer 260 is small, and the rigidity of the adhesive layer 260 can be secured even when the Young's modulus $E_2$ is small as long as the thickness $t_2$ of the adhesive layer 260 is large. It should be noted that the value of $5 \times 10^{-12}$ was derived though experiments based on the rigidity of the film 240 at which no distortion occurs in an HUD image. More preferably, the relationship between $t_2$ and $E_2$ satisfies $E_2 t_2^3 \geq 5 \times 10^{-11}$, still more preferably satisfies $E_2 t_2^3 \geq 5 \times 10^{-10}$, and particularly more preferably satisfies $E_2 t_2^3 \geq 5 \times 10^{-9}$. Also, $E_2$ is preferably 5 kPa or more, more preferably 10 kPa or more, and still more preferably 20 kPa or more.

Also, the summation of the thickness of the adhesive layer 250 and the thickness of the adhesive layer 260 is preferably 7 μm or more, and is preferably less than 25 μm. When the summation of the thickness of the adhesive layer 250 and the thickness of the adhesive layer 260 is in the above range, it is possible to maintain the smoothness of the surfaces of the film 240 at the vehicle-inner side and the vehicle-outer side for allowing the surfaces of the film 240 at the vehicle-inner side and the vehicle-outer side to become in conformity with the flat surface of the glass plate 210 at the vehicle-inner side and the flat surface of the glass plate 220 at the vehicle-outer side, and it is possible to reduce the distortion of the HUD image. In particular, in a configuration in which an image enlarged by a concave mirror and the like is reflected upon being further enlarged by curved laminated glass, slight undulation of the surfaces of the film 240 at the vehicle-inner side and the vehicle-outer side causes a large distortion in the HUD image, and therefore, it is extremely important to improve the smoothness of the surfaces of the film 240 at the vehicle-inner side and the vehicle-outer side. When the summation of the thickness of the adhesive layer 250 and the thickness of the adhesive layer 260 is in the above range, distortion of the HUD image can be alleviated even in a configuration in which an image enlarged by a concave mirror and the like is reflected upon being further enlarged by curved laminated glass.

In this manner, the adhesive layer 260 for bonding the film 240 and the interlayer film 230 may be provided. In this case, the distortion of the HUD image can be alleviated by controlling the thicknesses of the adhesive layers 250 and 260 as described above.

Second Embodiment

The second embodiment shows an example in which an adhesive layer and a film are provided between a glass plate at a vehicle-outer side and an interlayer film. In the second embodiment, explanation about the same components as those of the embodiment explained above may be omitted.

Figure 5:
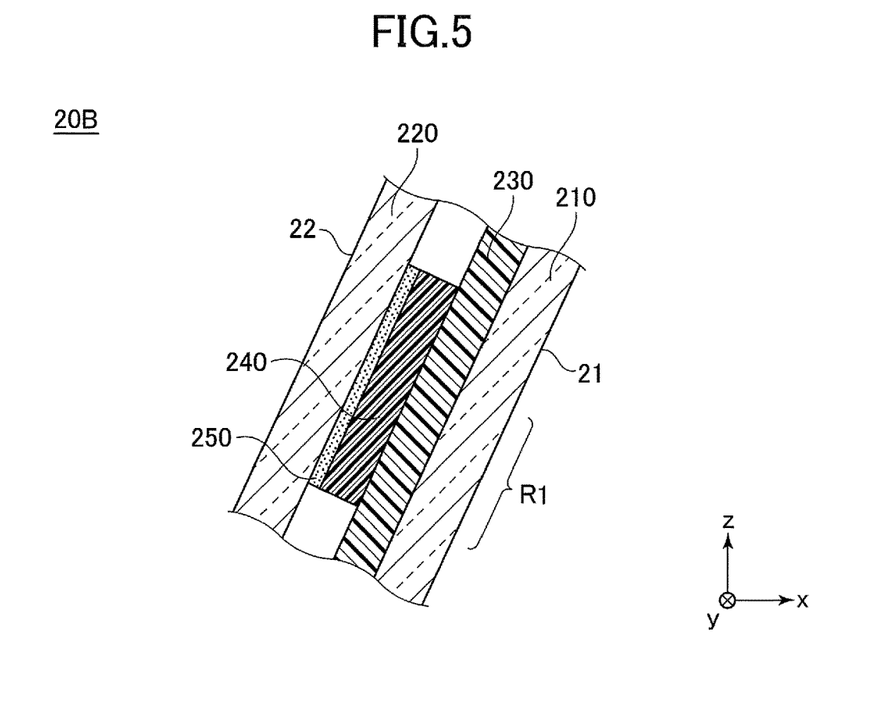
FIG. 5 is a partial cross-sectional view of a windshield 20B in a configuration similar to FIG. 1A taken along the plane XZ as seen from the Y direction.

FIG. 5 is a partial cross-sectional view of a windshield 20B, having a configuration similar to FIG. 1A, taken along the XZ direction as seen from the Y direction. As illustrated in FIG. 5, the windshield 20B is laminated glass in which an interlayer film 230, a film 240, and an adhesive layer 250 are provided between a glass plate 210, i.e., a vehicle-inner side glass plate, and a glass plate 220, i.e., a vehicle-outer side glass plate.

In the HUD display area $R_1$ of the windshield 20B, the film 240 and the adhesive layer 250 are arranged between the glass plate 220 and the interlayer film 230. A surface of the film 240 at the vehicle-inner side is bonded by the interlayer film 230 to a surface of the glass plate 210 at the vehicle-outer side. The surface of the film 240 at the vehicle-outer side is bonded by the adhesive layer 250 to the surface of the glass plate 220 at the vehicle-inner side. The material of the thickness of the adhesive layer 250 are as described in the first embodiment.

As described above, the film 240 may be arranged relatively close to the glass plate 220 with respect to the interlayer film 230. In this case, the distortion of the HUD image can be alleviated by controlling the thickness of the adhesive layer 250 like the first embodiment.

First Modified Embodiment of Second Embodiment

The first modified embodiment of the second embodiment illustrates an example in which an adhesive layer is also provided between the film and the interlayer film. In the first modified embodiment of the second embodiment, explanation about the same components as those of the embodiment explained above may be omitted.

Figure 6:
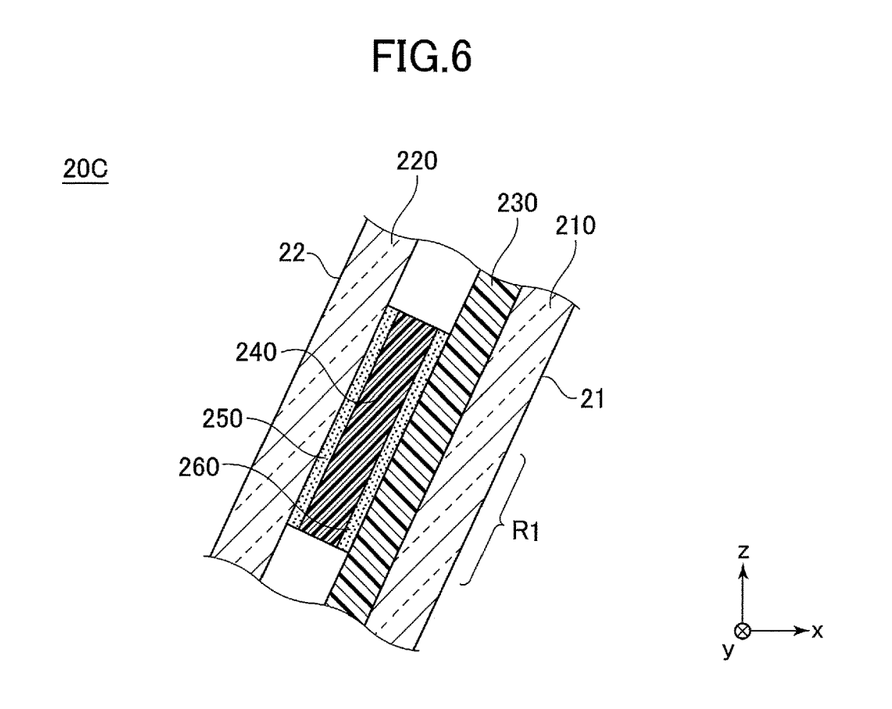
FIG. 6 is a partial cross-sectional view of a windshield 20C in a configuration similar to FIG. 1A taken along the plane XZ as seen from the Y direction.

FIG. 6 is a partial cross-sectional view of a windshield 20C, having a configuration similar to FIG. 1A, taken along the XZ direction as seen from the Y direction.

The windshield 20C as illustrated in FIG. 6 is different from the windshield 20B (see FIG. 5 and the like) in that an adhesive layer 260 is provided between a film 240 and an interlayer film 230. As illustrated in FIG. 6, the windshield 20C is laminated glass in which the interlayer film 230, the film 240, an adhesive layer 250, and the adhesive layer 260 are provided between a glass plate 210, i.e., a vehicle-inner side glass plate, and a glass plate 220, i.e., a vehicle-outer side glass plate.

In the HUD display area $R_1$ of the windshield 20C, the film 240 and the adhesive layers 250 and 260 are arranged between the glass plate 220 and the interlayer film 230. A surface of the film 240 at the vehicle-inner side is bonded by the adhesive layer 260 to the interlayer film 230, and is bonded by the interlayer film 230 to a surface of the glass plate 210 at the vehicle-outer side. A surface of the film 240 at the vehicle-outer side is bonded by the adhesive layer 250 to a surface of the glass plate 220 at the vehicle-inner side. The material and thickness of the adhesive layer 260 are as described in the first modified embodiment of the first embodiment.

Also, in the adhesive layer 260, a difference in the principal refractive index in the in-plane direction (a direction perpendicular to the thickness direction) at 550 nm is preferably within 0.1. When the adhesive layer 260 located at the vehicle-inner side with respect to the film 240 satisfies the above condition, the polarization state of the P-polarized light reaching the film 240 is less affected.

In this manner, the film 240 may be provided relatively close to the glass plate 220 with respect to the interlayer film 230, and the adhesive layer 260 for bonding the film 240 and the interlayer film 230 may be provided. In this case, the distortion of the HUD image can be alleviated by controlling the thicknesses of the adhesive layers 250 and 260 in a manner similar to the first modified embodiment of the first embodiment.

EXAMPLES AND COMPARATIVE EXAMPLES

The glass plates 210 and 220 were prepared, and laminated glasses of Examples 1 to 8 and Comparative Examples 1 to 4 were made with the interlayer films 230 and the films 240 sandwiched therebetween.

The glass plates 210 and 220 had a size of 300 mm×300 mm×thickness 2 mm. The interlayer film 230 was of PVB having a thickness of 0.76 mm. A high reflection film having a size of 150 mm×150 mm×a thickness of 50 μm with titania coating on PET was used as the film 240. An acrylic adhesive was used as the adhesive layer. The high reflection film was positioned in the central part of the laminated glass. In the HUD display area, the laminated glass had a curvature of a radius of 5000 mm in the vertical direction and had a curvature of a radius of 2000 mm in the horizontal direction.

Examples 1 to 5 were laminated glasses having a cross section as illustrated in FIG. 3. The thicknesses of the adhesive layers 250 in Examples 1 to 5 were 6 μm, 10 μm, 15 μm, 20 μm, and 24 μm, respectively.

Comparative Examples 1 and 2 were laminated glasses having a cross section as illustrated in FIG. 3. The thicknesses of the adhesive layers 250 in Comparative Examples 1 and 2 were 5 μm and 25 μm, respectively.

Examples 6 to 8 were laminated glasses having a cross section as illustrated in FIG. 4. The thicknesses of the adhesive layers 250 in Examples 6 to 8 were 6 μm, 15 μm, 10 μm, respectively. The thicknesses of the adhesive layers 260 in Examples 6 to 8 were 1 μm, 15 μm, 24 μm, respectively.

Comparative Examples 3 and 4 were laminated glasses having a cross section as illustrated in FIG. 4. The thicknesses of the adhesive layers 250 in Comparative Examples 3 and 4 were 30 μm and 10 μm, respectively. The thicknesses of the adhesive layer 260 of Comparative Examples 3 and 4 were 10 μm and 25 μm, respectively.

First, with respect to Examples 1 to 8 and Comparative Examples 1 to 4, the appearances and the reflection distortions of the glasses were evaluated. Specifically, a sensory evaluation was performed in terms of appearance and reflection distortion of the laminated glasses when black and white fringes are reflected on the laminated glasses. When an observer does not feel uncomfortable in terms of visibility with the naked eye, the appearance and the reflection distortion was evaluated as "GOOD". When an observer feels uncomfortable, the appearance and the reflection distortion was evaluated as "POOR".

Secondly, with respect to Examples 1 to 8 and Comparative Examples 1 to 4, distortions of the HUD images reflected by the concave mirror were evaluated. Specifically, an evaluation was performed as to whether "the amount of distortion of a line in the vertical direction" was more than 0.017 deg when a horizontal line having a thickness of 0.034 deg (=2 min) was projected 2 meters ahead of the laminated glass. When "the amount of distortion of a line in the vertical direction" was not more than 0.017 deg (=1 min), the distortion of the HUD image was evaluated as "GOOD". When "the amount of distortion of a line in the vertical direction" was more than 0.017 deg (=1 min), the distortion of the HUD image was evaluated as "POOR".

Thirdly, with respect to Examples 1 to 8 and Comparative Examples 1 to 4, edge deteriorations of the adhesive layer 250 were evaluated. Specifically, an evaluation was performed as to whether there was any edge deterioration of the adhesive layer 250 after a high temperature and high humidity durability test was conducted for 1000 hours at a temperature of 50 degrees Celsius with a humidity of 95%. In a case where an observer cannot observe edge deterioration with the naked eye, the edge deterioration was evaluated as "GOOD". In a case where an observer observes edge deterioration with the naked eye, the edge deterioration was evaluated as "POOR".

Figure 7:
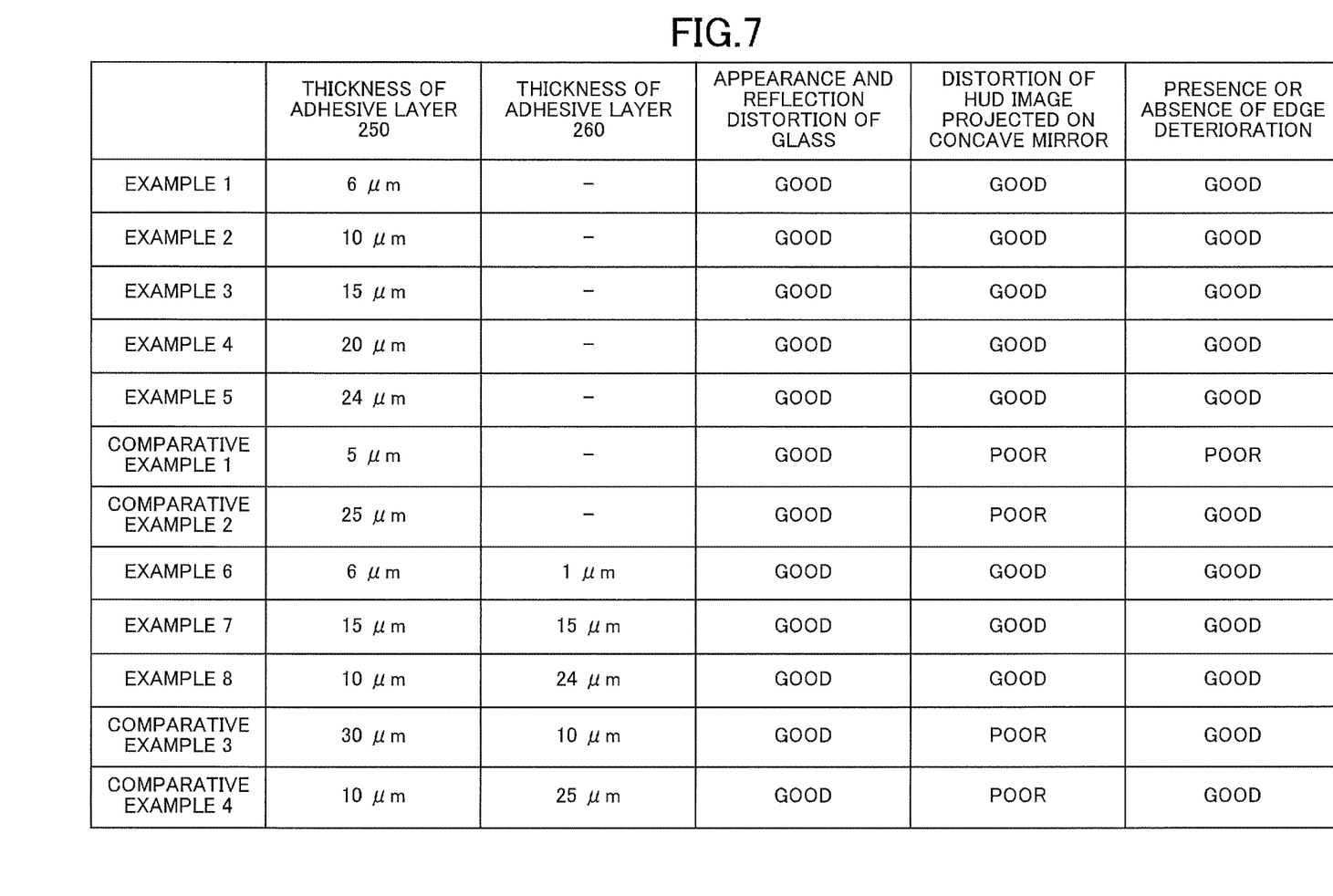
FIG. 7 is a table illustrating evaluation results with respect to Examples and Comparative Examples.

FIG. 7 summarizes the first to third evaluation results with respect to Examples 1 to 8 and Comparative Examples 1 to 4. As illustrated in FIG. 7, the appearance and reflection distortion of the glasses are at such levels that the observer does not feel uncomfortable with respect to any of Examples 1 to 8 and Comparative Examples 1 to 4.

With respect to the distortion of the HUD image, it was found that, in Examples 1 to 8, "the amount of distortion of a line in the vertical direction" does not exceed 0.017 deg.

In any of Examples 1 to 8, the thickness of the adhesive layer 250 was 6 μm or more, and was less than 25 μm. It is considered that, in Examples 1 to 8, because the thickness of the adhesive layer 250 was 6 μm or more, the adhesive layer 250 alleviated the difference in the thermal shrinkage between the glass plate 210 and the film 240 during pressure bonding in the production of laminated glass, and because the thickness of the adhesive layer 250 was less than 25 μm, the surfaces of the film 240 at the vehicle-inner side and the vehicle-outer side were in conformity with the flat surface of the glass plate 210 at the vehicle-outer side, and the smoothness of the surfaces of the film 240 at the vehicle-inner side and the vehicle-outer side was maintained, so that the distortion of the HUD image was alleviated.

In contrast, the result with respect to Comparative Examples 1 to 4 was that "the amount of distortion of a line in the vertical direction" was more than 0.017 deg. In other words, distortion occurred in the HUD image.

It is considered that, in Comparative Example 1, because the thickness of the adhesive layer 250 was small (5 μm), the adhesive layer 250 could not alleviate the difference in the thermal shrinkage between the glass plate 210 and the film 240 during pressure bonding in the production of laminated glass, and the smoothness of the surfaces of the film 240 at the vehicle-inner side and the vehicle-outer side was not maintained, and distortion occurred in the HUD image.

It is considered that, in Comparative Examples 2 and 3, because the thicknesses of the adhesive layer 250 were thick (25 μm, 30 μm), the surfaces of the film 240 at the vehicle-inner side and the vehicle-outer side were unable to become in conformity with the flat surface of the glass plate 210 at the vehicle-outer side, and the smoothness of the surfaces of the film 240 at the vehicle-inner side and the vehicle-outer side was not maintained, so that distortion occurred in the HUD image.

In Comparative Examples 4, because the thickness of the adhesive layer 260 was thick (25 μm), the surface of the film 240 at the vehicle-outer side was unable to become in conformity with the flat surface of the glass plate 220 at the vehicle-inner side, and the smoothness of the surface of the film 240 at the vehicle-outer side was not maintained, so that distortion occurred in the HUD image.

With regard to the edge deterioration, only in Comparative Example 1, edge deterioration was found in the adhesive layer 250. This is considered to be because, in Comparative Example 1, the thickness of the adhesive layer 250 was too small (5 μm).

In this manner, when the thickness of the adhesive layer 250 bonding the glass plate 210 and the film 240 is set to 6 μm or more, and to less than 25 μm, the reflection distortion and the distortion of the HUD image can be reduced, and the edge deterioration of the adhesive layer 250 is less likely to occur.

The preferred embodiment and the like have been described above in detail, but the embodiments and the like are not limited to the above-described embodiments, and various modifications and substitutions can be applied to the embodiments and the like without departing from the scope of the claims.

What is claimed is:

1. A laminated glass comprising:
a vehicle-outer side glass plate;
a vehicle-inner side glass plate;
an interlayer film disposed between the vehicle-outer side glass plate and the vehicle-inner side glass plate; and
a first film disposed between the interlayer film and one of the vehicle-outer side glass plate and the vehicle-inner side glass plate, the first film being bonded by a first adhesive layer to the one of the vehicle-outer side glass plate and the vehicle-inner side glass plate,
wherein the first film is disposed in at least a part of a display area configured to display information by reflecting an image projected from an inside of a vehicle, and
wherein a thickness of the first adhesive layer is 6 μm or more, and is less than 25 μm.

2. The laminated glass according to claim 1, wherein the thickness of the first adhesive layer is 6 μm or more and 20 μm or less.

3. The laminated glass according to claim 2, wherein the thickness of the first adhesive layer is 6 μm or more and 15 μm or less.

4. The laminated glass according to claim 1, wherein the first film is a visible light control film configured to reflect the image projected from the inside of the vehicle.

5. The laminated glass according to claim 1, wherein a relationship between the thickness, denoted as $t_1$ in units of mm, of the first adhesive layer and a Young's modulus, denoted as $E_1$ in units of N/mm², of the first adhesive layer satisfies $E_1 t_1^3 \geq 5 \times 10^{-12}$.

6. The laminated glass according to claim 1, further comprising a second adhesive layer disposed between the interlayer film and the first film.

7. The laminated glass according to claim 6, wherein a relationship between a thickness, denoted as $t_2$ in units of mm, of the second adhesive layer and a Young's modulus, denoted as $E_2$ in units of N/mm², of the second adhesive layer satisfies $E_2 t_2^3 \geq 5 \times 10^{-12}$.

8. The laminated glass according to claim 6, wherein a thickness of the second adhesive layer is 1 μm or more, and is less than 25 μm.

9. The laminated glass according to claim 8, wherein the thickness of the second adhesive layer is 1 μm or more and 20 μm or less.

10. The laminated glass according to claim 9, wherein the thickness of the second adhesive layer is 1 μm or more and 15 μm or less.

11. The laminated glass according to claim 6, wherein a summation of the thickness of the first adhesive layer and a thickness of the second adhesive layer is 7 μm or more, and is less than 25 μm.

12. The laminated glass according to claim 1, wherein when the laminated glass is attached to the vehicle, a radius of curvature in a vertical direction of the display area is 4000 mm or more and 20000 mm or less, and a radius of curvature in a horizontal direction of the display area is 1000 mm or more and 10000 mm or less.

13. The laminated glass according to claim 1, wherein a thickness of the first film is 25 μm or more and 200 μm or less.

14. The laminated glass according to claim 1, wherein the first film is a P-polarized light reflection film, and
in a state where the first film is sealed in the laminated glass, a reflectivity of the first film with respect to P-polarized light with an incidence angle being Brewster's angle is 5% or more.

15. The laminated glass according to claim 1, wherein the first adhesive layer is located at a vehicle-inner side with respect to the first film, and
a difference in a principal refractive index of the first adhesive layer in an in-plane direction with respect to light having a wavelength of 550 nm is within 0.1.

16. The laminated glass according to claim 1, wherein a field of view of the image projected is 4 deg×1 deg or more.

* * * * *